Feb. 10, 1925. Re. 15,999
R. T. WOODHEAD
COMBINED FORD PRIMER AND CARBURETOR CONTROL
Original Filed March 9, 1922
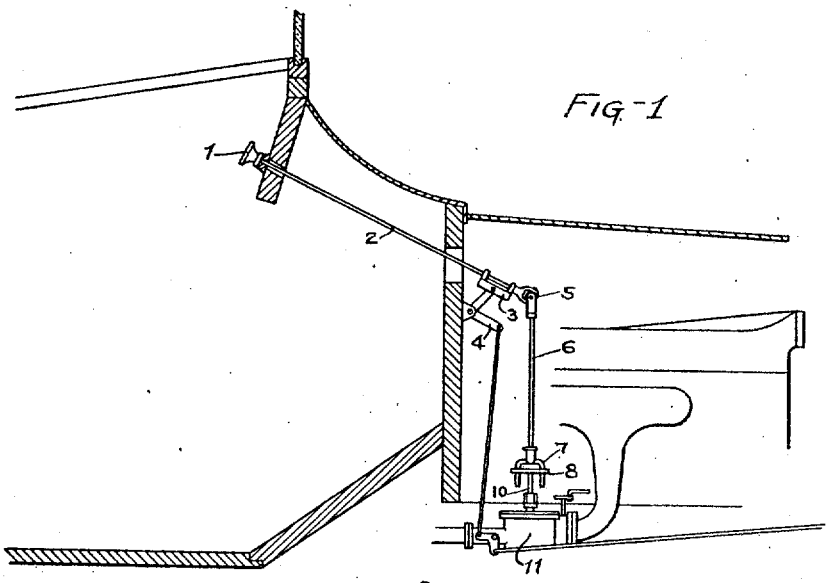
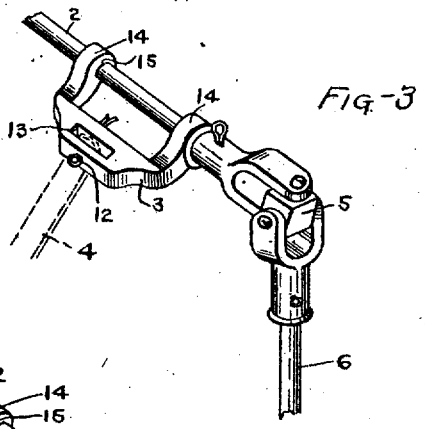
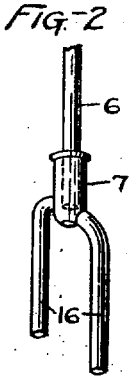
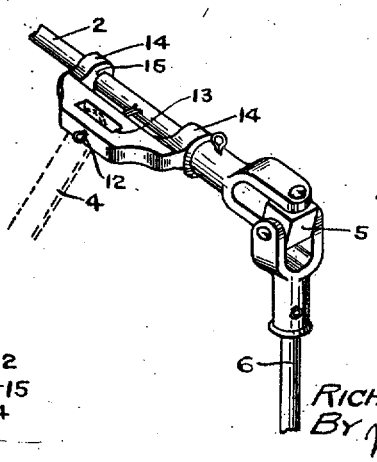
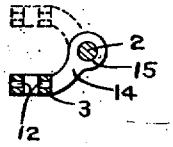
INVENTOR:
RICHARD T. WOODHEAD.
BY Whiteley and Ruckman
ATTORNEYS.

137 WATER DISTRIBUTION
Valve actuation

Draftsman

Reissued Feb. 10, 1925.

Re. 15,999

UNITED STATES PATENT OFFICE.

RICHARD THURWALD WOODHEAD, OF ST. PAUL, MINNESOTA.

COMBINED FORD PRIMER AND CARBURETOR CONTROL.

Original No. 1,455,318, dated May 15, 1923, Serial No. 542,459, filed March 9, 1922. Application for reissue filed December 20, 1923. Serial No. 681,890.

*To all whom it may concern:*

Be it known that I, RICHARD THURWALD WOODHEAD, a citizen of the United States, residing at St. Paul, in the county of Ramsey and State of Minnesota, have invented certain new and useful Improvements in Combined Ford Primers and Carburetor Controls, of which the following is a specification.

My invention relates to improvements in a combined Ford primer and carburetor control, the purposes of which are (1) to eliminate the necessity for the person operating a Ford car, in order to accomplish an adjustment of the carburetor so as to increase or diminish the consumption of gasoline, of groping around under the instrument board and to locate on the dash the arm of the small rod which controls the needle valve of the carburetor, so that the carburetor may be easily adjusted; (2) to enable the Ford operator to adjust the carburetor by turning the button on the instrument board, ordinarily at the end of the rod used for priming purposes, either to the right or left in controlling the needle valve of the carburetor and effecting an adjustment without impairing its use for priming purposes; (3) to enable the Ford operator by pulling out on said button to accomplish priming without interfering with the carburetor adjustment, so that by one medium of control, either the adjustment or priming of the carburetor may be accomplished; (4) to create this combined control by a mechanism so designed and constructed as to avoid rattle or noise when the Ford car in which it is installed is in motion or operation, by virtue of close fitting and semi-rigid parts; (5) to provide the mechanism affording said combined control with a casting hereinafter described explicitly, the position of which may be reversed in such a way as to overcome the difference in height or elevation of the rod extending from the crossbar on top of the needle valve of the carburetor so that said casting may be connected with the upper arm of the bell crank without substituting another rod for, or altering the height of, said rod so that said combined primer and carburetor control may be installed without loss of time and without the necessity for making alterations in or substitutions for any of the mechanism of this character with which a Ford car is ordinarily equipped when marketed or changing the position thereof as originally installed; and (6) to provide a fork at the end of the rod extending from the crossbar on top of the needle valve of the carburetor which will fit into said crossbar in such a way as to be practically noiseless and rattle proof and so as to insure an efficient and certain connection with said crossbar at all times when the mechanism is in use or operation either for priming or adjustment purposes; (7) and more particularly in accomplishing the above defined objects and purposes to arrange the rod for rotating or turning the carburetor adjusting device so that said rod extends lineally in substantially a vertical direction above and pivotally supported by the carburetor whereby said rod may be oscillated or rocked upon said pivotal and swiveled support at the time that the operating button is pulled longitudinally to control the choker or priming instrumentality without affecting the carburetor adjustment.

I attain these objects by the mechanism illustrated in the accompanying drawings in which—

Figure 1 illustrates the position and general outline of the Ford equipment for priming purposes, together with the attachments and innovations herein described which combine to create a Ford primer and carburetor control through one medium of operation; Figure 2 presents a general outline of the fork which fits into the crossbar on top of the needle valve of the carburetor; Fig. 3 is a detail view of the casting 3, bell crank 4, and the connection between the rod 2 and rod 6. Fig. 4 is also a detail view showing the position of the casting on the rod reversed. Fig. 5 is a detail view showing the casting in a position in which it extends downwardly from the rod, and also, in dotted lines, in a position in which the casting is reversed and extends upwardly from the rod.

Similar numerals refer to similar parts throughout the several views.

In my invention the rod 2 which runs from the instrument board through the dash, which ordinarily connects with the bell crank 4 meets the rod 6 which attaches to the crossbar 8 on top of the needle valve 10 of the carburetor 11. At the junction of these two rods 2 and 6 the end of each rod is equipped with a fork and by means of a cube casting 5 to which both these rods are joined, a universal joint is formed permitting a rotary motion to the right or left. Thus by turning the button 1 on the instrument board at the head of the rod 2 the needle valve 10 of the carburetor 11 may be turned either to the right or left, so as to increase or diminish the consumption of gasoline as may be required.

It is particularly to be noted that the rod 6 is supported by means of the fork 7 and crossbar 8 in a position wherein the rod 6 extends substantially vertically above the needle valve 10. The connection is a loose or swivel connection; and the position of the rod 6 vertically above the valve permits the rod to be rocked at its upper end a material distance without affecting the needle valve and without any lost motion device other than the loose swivel connection made by the fork 7 and the crossbar 8.

The rod 2 which runs from the instrument board through the dash to the universal joint is inserted through a casting 3 equipped with an arm 14 at each end, each arm being provided with a hole 15 to accommodate said rod 2. With the exception of the two small arms 14, equipped with said holes 15 through which said rod 2 runs, the body of this casting 3 practically rests parallel with said rod 2, one end of said casting abutting the base of the fork at the joint end of the rod 2, and being held in a semi-rigid position by this means and by connection with the upper arm of the bell crank 4. The body of this casting 3 is equipped with a rectangular slot or hole 13, a hole 12 being drilled through either side of the body of the casting 3 so that the upper arm of the bell crank 4 may be inserted into the said rectangular slot or hole 13 in the body of said casting 3 and a connection made by means of a cotter pin or small bolt with nut. The two arms 14 through which the rod 2 runs, extend from the body of said casting 3 at such an angle that when the casting 3 is placed on said rod 2 and is in position to accommodate the upper arm of the bell crank 4, the two said arms 14 tend downward from rod 2 as shown in Fig. 3 and when the position of the casting 3 is reversed, end for end, on said rod 2 the said arms 14 tend upward, as shown in Fig. 4. Thus if the height of the rod 6 extending from the crossbar 8 on top of the needle valve 10 of the carburetor 11 necessitates it, the casting 3 may be placed on said rod 2 so that the two arms 14 tend downward and the body of the casting 3 at a lower elevation is in a position (Fig. 3) where an easy connection may be made with the upper arm of the bell crank 4; or if the height of said rod 6 extending from the crossbar 8 on top of the needle valve 10 of the carburetor necessitates it, the casting 3 may be placed on the rod 2 so that the two arms 14 tend upward from rod 2 as shown in Fig. 4, attaining a higher elevation for the body of the casting simply by reversing the position of said casting 3, end for end, on the rod 2. Thus the elevation of the body of the casting 3 may be raised or lowered approximately three-quarters of an inch so as to overcome the difference in the height of the rod 6 and so as to adjust the position of the body of the casting to permit a connection with the upper arm of the bell crank 4 regardless of the height of the rod 6. By way of further explanation, it may be said that there are different types of carburetor installed in Ford cars and on this account the elevation of the crossbar 8 on top of the needle valve 10 varies, which is reflected in the height of the rod 6 running from said crossbar 8, necessitating a casting such as is described above capable of occupying positions which will meet and overcome the difference in the height of the rod 6 and permit an easily adjustable connection with the upper arm of the bell crank 4.

When the casting is thus attached to the rod 2 and bell crank 4, the priming process is accomplished by pulling on the button 1 on the instrument board at the end of the rod 2 and the attachment accomplished by means of said casting 3 causes the bell crank 4 to function in an upward and backward pull on the priming rod, thus choking or strangling the carburetor 11. Joint 5 is attached to rod 2 and when button 1 is pulled for priming the top of rod 6 swings to follow the movement of rod 2.

The fork 7 (shown by separate drawing as Figure 2) equipped with two pins or arms 16 which insert into the crossbar 8 on the top of the needle valve 10 of the carburetor 11 is especially designed and constructed so as to be noiseless and rattle proof and so as to permit sufficient play upward and downward when the mechanism is in use or operation. Thus when the button 1 is pulled outward on the instrument board for the purpose of priming, the fork 7 will be raised accordingly but on account of its design and construction at no time is the connection with the crossbar 8 on top of the needle valve 10 of the carburetor 11 in jeopardy of dislocation and at all times its position is such as to insure efficiency in use and operation for the purpose of carburetor adjustment. Furthermore, the position of rod 6 extending longitudinally in a substantially vertical direction directly above the needle valve 8 permits said rod to be rocked from its vertical position at the same time that the fork 7 is slightly raised in crossbar 8, thus en- 137. WATER DISTRIBUTION.
Valve actuation.

Draftsman abling the single operating rod 2 to perform the double function of rocking the bell crank 4 to operate the choker of the carburetor and at the same time rotating the rod 6 to operate the needle valve. Any form of connection between bell crank 4 and rod 2 may be used which will permit rotation of the rod 2 and at the same time prevent longitudinal movement of the rod 2 relative to the arm of bell crank 4 with which it connects.

My invention, by these instrumentalities, enables the Ford operator by pulling on the button 1 on the instrument board, or by turning the same, as the case may be, to either prime or adjust the carburetor conveniently and through one medium of control.

I am aware that prior to my invention mechanisms have been evolved with a combined primer and carburetor control in view. I therefore do not claim such a combination in its entirety.

I claim:

1. The combination with a carburetor for an internal combustion engine having an air valve and an adjustable fuel regulating valve, of an operating rod connected with the latter, an operating shaft connected with said rod for rotating the same while permitting longitudinal movement of said shaft without affecting the regulating valve, a member having a body portion extending parallel to said shaft and having arms extending from its ends which rotatably support said shaft, and connections between said member and said air valve for operating the latter by longitudinal movment of said shaft, said arms being inclined out of the plane of said body portion whereby the inner end of said shaft will be supported at different heights for reversed positions of said member.

2. The combination of an automobile and an engine, of a carburator for the engine, an air valve and a fuel regulating valve in said carburetor, a single operating lever adapted to operate both of said valves simultaneously or to operate either valve independently, a member pivotally connected to said lever near one end and provided with separated forwardly extending points at its opposite end adapted to cooperate with the fuel valve to actuate the same upon a rotation of the lever, a casting having a body portion and offset arms extending at right angles thereto provided with apertures receiving said lever by means of which the casting is attached to the lever, said casting having an elongated slot in the body thereof intermediate its ends, a bell crank lever projecting in said slot, and pivotally connected to said body intermediate the ends of the slot therein, and a connection between said bell crank lever and the carburetor air valve.

3. The combination with a carburetor for an internal combustion engine having an air valve, and an adjustable fuel regulating valve, of operating means for said valves comprising a lever mounted for a reciprocating and a rotating movement, a member pivotally connected to the outer end of said lever and projecting downwardly therefrom, said member being formed with a pair of vertical pin portions cooperating with a part carried by said needle valve, a casting having a body portion formed with offset arms extending at right angles thereto and having apertures passing through said arms to receive said lever and support the casting thereon, the body of the casting being provided with an elongated slot, a bell crank having one lever entering said slot and pivotally connected to the casting, a connection between the other arm of said bell crank lever and said air controlling valve whereby said air valve is operated independently of the gas controlling valve upon a reciprocation of the operating lever.

In testimony whereof, I hereunto affix my signature.

RICHARD THURWALD WOODHEAD.